(12) United States Patent
Kim

(10) Patent No.: US 7,650,912 B2
(45) Date of Patent: Jan. 26, 2010

(54) FLEXIBLE CONDUIT ELEMENT

(75) Inventor: Dae Hyun Kim, Gyeonggi-do (KR)

(73) Assignee: SJM Co., Ltd., Gyeonggi-Do (KR)

( * ) Notice: Subject to any disclaimer, the term of this patent is extended or adjusted under 35 U.S.C. 154(b) by 62 days.

(21) Appl. No.: 11/935,944

(22) Filed: Nov. 6, 2007

(65) Prior Publication Data

US 2009/0114303 A1    May 7, 2009

(51) Int. Cl.
*F16L 11/15* (2006.01)
(52) U.S. Cl. .................. 138/121; 138/122; 138/127; 138/135
(58) Field of Classification Search ............ 138/121, 138/122, 127, 135
See application file for complete search history.

(56) References Cited

U.S. PATENT DOCUMENTS

| | | | | |
|---|---|---|---|---|
| 4,854,416 A | * | 8/1989 | Lalikos et al. ............... | 181/207 |
| 4,867,269 A | * | 9/1989 | Lalikos et al. ............... | 181/207 |
| 5,456,291 A | * | 10/1995 | Kunzmann ................. | 138/121 |
| 5,617,900 A | * | 4/1997 | Weil .......................... | 138/127 |
| 5,660,419 A | * | 8/1997 | Kim .......................... | 285/226 |
| 5,769,463 A | * | 6/1998 | Thomas ....................... | 285/49 |
| 5,901,754 A | * | 5/1999 | Elsasser et al. ............. | 138/118 |
| 6,062,266 A | * | 5/2000 | Burkhardt ................... | 138/114 |
| 6,062,268 A | * | 5/2000 | Elsasser et al. ............. | 138/121 |
| 6,220,023 B1 | * | 4/2001 | Ezzeddini et al. ............. | 60/322 |
| 6,230,748 B1 | * | 5/2001 | Krawietz et al. ............. | 138/121 |
| 6,848,478 B2 | * | 2/2005 | Nagai ........................ | 138/112 |
| 2008/0012297 A1 | * | 1/2008 | Heil et al. ................... | 285/226 |

* cited by examiner

*Primary Examiner*—James F Hook
(74) *Attorney, Agent, or Firm*—Kirton & McConkie; Evan R. Witt

(57) ABSTRACT

The present invention refers to a flexible conduit element for an exhaust system of a combustion engine vehicle, comprising a helically or annularly corrugated metal bellows member, an outer flexible member disposed around the bellows member and the resilient member biasing the flexible outer member towards the metal bellows member. In order to improve the absorption of vibrations of a combustion engine, the outer flexible member comprises a reticulated structure.

19 Claims, 2 Drawing Sheets

FLEXIBLE CONDUIT ELEMENT

The invention relates to a flexible conduit element for an exhaust system of a combustion engine vehicle, comprising a helically or annularly corrugated preferably metal bellows member, an outer flexible member disposed around the bellows and a resilient member biasing at least a section of the flexible outer member towards the bellows member.

A flexible conduit element of the aforementioned kind is known from DE 10 2004 041 348. Such flexible conduit elements are commonly used in the automotive industry. They are placed within the exhaust system of a combustion engine vehicle between the exhaust pipe feeding from the engine and the muffler. The flexible conduit element serves as a decoupler joint in the exhaust system, and is exposed to heat and vibration as well as impact loads which are caused by operation of the engine and engine roll when starting the engine or during acceleration and braking or gear shifting. Also, road condition may generate vibrations of an exhaust pipe.

The known flexible conduit element comprises a metal bellows member, which is surrounded by an outer flexible member which is made of a braided wire mesh. A resilient member is provided around the outer flexible member compressing parts of the outer flexible member. The arrangement of the resilient member and the provision of the flexible outer member made of braided wire mesh has provided for significant reduction in resonant frequencies, thereby improving the dynamic characteristics of the flexible conduit elements significantly compared to previously known flexible conduits. A flexible conduit element without the resilient member is for example known from EP 1 576 263.

However, an increased output of power from the engines has led to increased demands concerning the absorption and buffering of vibrations and thus noise. It is, therefore, an object of the invention to obtain further improvements in terms of absorbing buffering vibrations, impact loads and heat distortion compared to the previously known devices. The object of the invention is achieved by a flexible conduit element of the aforementioned kind, wherein the outer flexible member comprises a reticulated structure.

It has been shown that the use of a reticulated structure in a flexible conduit element comprising a resilient member has led to a further significant reduction in the dynamic stiffness around its resonance and the number of its resonances compared to a structure using a braided wire material in combination with the resilient member. Also, the use of the resilient member shows a larger traction limit compared to devices not using a resilient member. A larger traction limit allows a longer axial extension of the flexible conduit element compared to embodiments not using a resilient member.

In a preferred embodiment, the reticulated structure of the flexible outer member is a net structure. Such a net structure allows to further improve the properties of the present invention. Forming the net structure by a knitted structure allows a rather simple and cost-efficient way of manufacturing of the outer flexible member.

It may also be preferred if the outer flexible member is essentially completely a reticulated structure.

In order to provide for rigidity, the flexible outer member may be made of a metal wire material.

The reticulate or net structure of the flexible outer member may comprise openings between the metal wire material and said openings may cover at least 50% of the total surface of the flexible outer member. It has been shown that such an open net structure improves further the properties of the present invention.

It may generally be advantageous if the flexible outer member forms a hose disposed around the bellows member. Such an arrangement allows to cover completely the bellows member.

It may also be advantageous if the flexible outer member is attached to both ends of the bellows member. This also allows to further improve the vibration buffering properties of the flexible conduit element according to the present invention.

In a further preferred embodiment, the flexible outer member may be elastically deformable at least in its axial direction. This allows to have the outer flexible member being under tension during operation. Such an arrangement is particularly advantageous concerning the axial extension of the flexible conduit element. This allows to adjust the tension limit and the behaviour of the conduit element close during axial extension while in operation.

In a further embodiment, the bellows member may comprise corrugations of a shorter radial extension than the neighbouring corrugations and the corrugations of a radial shorter extension form a groove. This allows a controlled support of the outer flexible member and the resilient member in the groove. The outer flexible member may always be supported by the peaks of the corrugations. It is thereby possible to accurately finally adjust a tension to be brought into the outer flexible member or to align the outer flexible member with the bellows member. The previously known embodiments such as the embodiment according to DE 10 2004 041 348 do not provide a comparable groove. Instead, a certain number of corrugations was omitted and neighbouring corrugations had a greater distance such that the outer flexible member is hanging in-between the corrugations without any radial support.

It may be advantageous if the groove is located in a middle section of the bellows member. This allows to have a symmetrical arrangement of the flexible conduit.

In an alternative embodiment, it may also be possible to provide several grooves.

It may furthermore be advantageous if the resilient member is disposed about the groove. It is thereby possible to have the resilient member extend around the groove and urge the flexible outer member into the groove. The outer flexible member may thereby be held between at least one of the corrugations forming the groove and the resilient member.

The resilient member may thereby at least partially be received within the groove. This allows to also axially position the resilient member.

Furthermore, the conduit element may comprise an inner tube within the bellows member. This allows to directly lead the exhaust gas through the bellows. This inner tube can also limit the axial extension of the bellows, however still allows the conduit element to be flexible.

It might be preferable that the inner tube comprises an agrafe-type hose. In particular, with respect to limiting the extension of the conduit element, the agrafe-type hose may be advantageous. It has also very little resistance against axial extension. Alternatively, the inner tube may comprise a braided hose. Such a braided hose allows for greater flexibility of the conduit element.

The invention will be described by two embodiments depicted in the following Figures.

Figure 1:
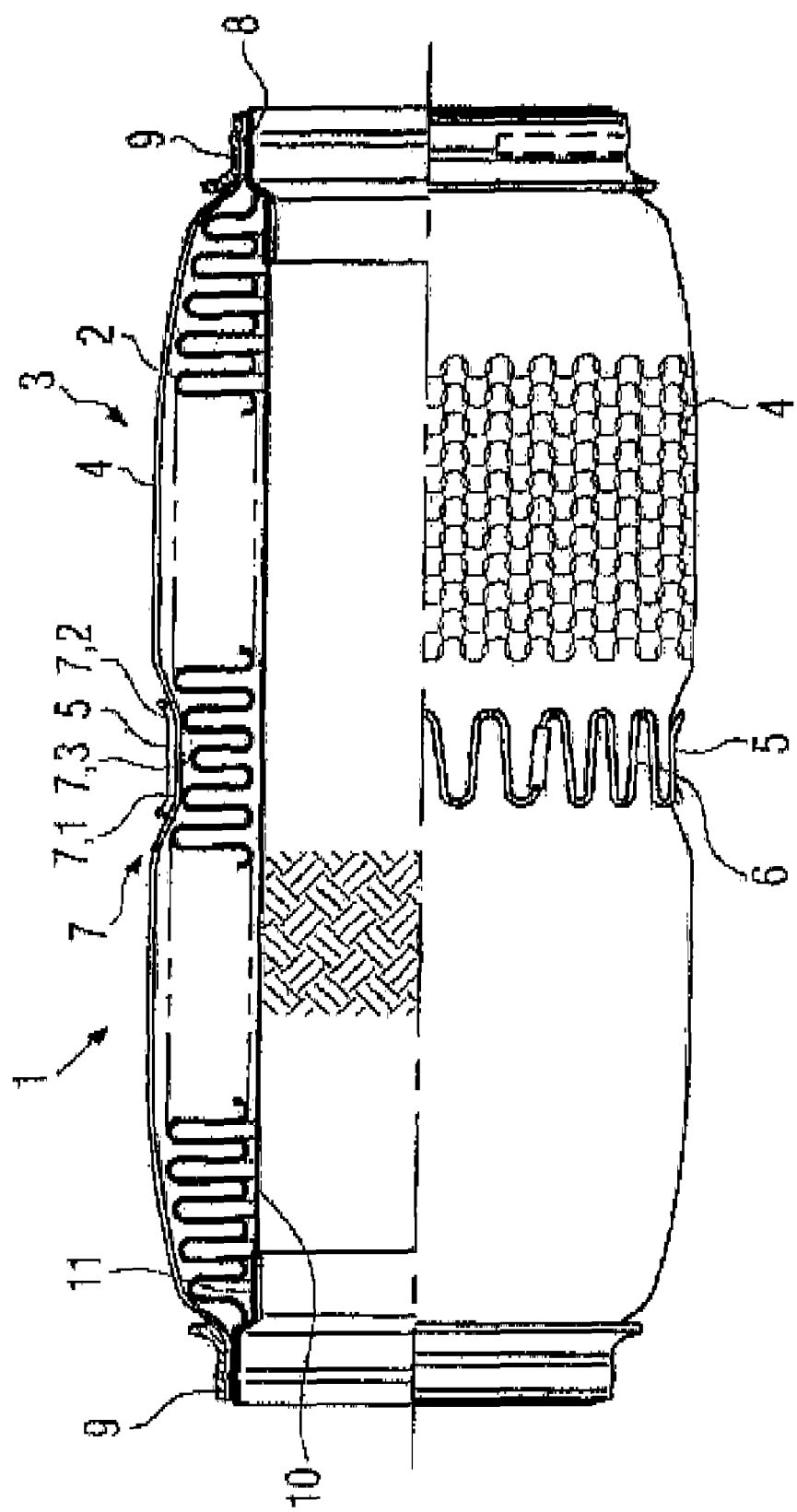
FIG. 1 shows a partial cross-section of a flexible conduit element according to the invention of a first embodiment.

FIG. 1 shows the flexible conduit element 1 for an exhaust system for a combustion engine vehicle. The flexible conduit is located between the exhaust pipe coming from the engine and a pipe leading to the muffler. The pipes and the muffler are not shown in the Figures. However, this arrangement of a flexible conduit element within the exhaust system of a vehicle is known to the skilled person.

The flexible conduit element comprises a metal bellows member 2 with annular corrugations 3. The metal bellows member 2 is surrounded by an outer flexible member 4 which is comprised of a reticulated structure, in particular a net structure of a knitted wire mesh. The net structure is visible in FIG. 1 in the lower half, which depicts an outer view of the flexible conduit element. The upper half in FIG. 1 shows a cross-section. As can be seen in FIG. 1, between the wire of the net structure there are openings which lead to a very open structure of the net structure. In a view as depicted in FIG. 1, the openings between the wire constitute more than 50%, preferably 75% of the total surface of the essentially cylindrical arrangement of the net structure of the outer flexible member 4.

The flexible conduit element 1 further comprises a resilient member 5 which is disposed around the outer flexible member 4 and thus also the bellows member 2. The resilient member 5 is a spring member which is essentially ring-shaped surrounding the bellows and the outer flexible member in order to obtain a tensioning force, the resilient member 5 comprises undulations 6 which allow to flex to resilient member 5. Resilient member 5 generates a tensioning force towards the bellows member. As an alternative, a spirally-shaped spring element may also be provided, which surrounds the flexible conduit element.

As can also be seen from FIG. 1, the resilient member 5 is an engagement with the outer surface of the outer flexible member 4 and biases a section of the outer flexible member 4 towards the bellows member 2. The outer flexible member 4 is generally flexible in the axial direction of the flexible conduit element as well as in its circumferential direction. It is generally hose-shaped and extends along the entire length of the corrugations 3 of the bellows member 2. The length is adapted such that it touches in an unextended condition of the flexible conduit element, the bellows member 2 in the area of the resilient member 5 as it is biased towards the bellows member by the resilient member. The bellows member 2 comprises corrugations of different radial extension. From the outermost corrugations towards the inside, the radial extension of the corrugations increases to a sequence of corrugations 3 of equal height. At about the middle of the flexible conduit element 1, the radial extension of the corrugations is again reduced, such that the corrugations form a groove 7 formed by corrugations of a smaller radial extension 7.1, 7.2 and 7.3. Of course, there might also be a greater number of undulations of reduced radial extension as well as a smaller number of such corrugations. In the preferred embodiment, three corrugations form the groove whereas the middle corrugation has the smallest radial extension.

The resilient member 5 is disposed around this groove 7 and its dimensions are chosen in a way such that the resilient member 5 is more or less received completely within the groove. The resilient member 5 pushes the outer flexible member 4 into the groove, such that it touches the tips of at least one or two of the corrugations of reduced radial extension.

At the outer ends of the flexible conduit element, the metal bellows member 2 and the outer flexible member 4 abut each other and are held together by respective two ring-shaped elements, namely an inner ring-shaped element 3 and an outer ring-shaped element 9. The two ring-shaped elements 8 and 9 clamp the bellows member 2 and the outer flexible member 4 together in a known manner.

Due to the use of the ring-shaped elements 8 and 9, the outer flexible member 4 receives a shape, where it touches the outer corrugations of the metal bellows at their tips. In an unextended condition of the flexible conduit element as depicted, there is a gap between the corrugations and the outer flexible member in the areas next to the groove 7, which corresponds about to the area where the radial extension of the corrugations 3 is constant. Upon expanding the flexible conduit element in an axial direction, the outer flexible member 4 is flexed and may essentially completely touch the tips of the corrugations 3 of the bellows member 2 also in the areas where the radial extension of the corrugations is essentially constant. The gap will thus disappear.

Furthermore, the flexible conduit element comprises within the bellows member an inner tube 10 which is comprised of a braided wire mesh. The shape of the braided wire mesh is depicted in the upper half of FIG. 1 which is a cross-section and shows the inner tube. The inner tube 10 is attached to the inner ring-shaped element 8 by using a clamping ring 11. The inner tube 10 is thereby held between the inner ring-shaped element 8 and the clamping ring 11. The inner tube 10 which is comprised of a braided wire mesh hose is designed in such a way as it does not touch the corrugations of the bellows member 2 in an unbent condition as depicted in FIG. 1. Due to the use of a braided wire mesh for the inner tube 10, an exhaust guided through the flexible conduit element will for the most part go through the inner tube 10 into the metal bellows member, as the braided wire mesh forms a more or less solid surface with more or less no openings between the bunches of wires forming the wire mesh. Thus, the metal braid of the inner tube is of a completely different design than the design of the outer flexible member 4.

The advantages in functioning of the invention according to the first embodiment will now be described.

When installed in the exhaust system of the vehicle, the tubes of the exhaust gas system are to be received within the inner ring-shaped elements 8 on either side of the flexible conduit element. Exhaust gas is directed through these tubes and also through the inner tube 10 of the flexible conduit element. During starting the engine or operating the vehicle, movements of the pipes and vibrations are introduced into the pipes and thus also into the flexible conduit element. The flexible conduit element 1 allows to absorb rather large movements in-between the two pipes attached to either side of the flexible conduit element. During operation of the combustion engine, vibrations are generated depending on the revolution speed of the engine and the design of the engine for example. In the case of a four-cylinder in-line engine, certain resonant frequencies known to the skilled person are generated. It has been shown that using a structure according to the present invention using a flexible conduit element comprising an outer flexible member with a reticulate structure and using a resilient member 5. The vibration of such engines have been reduced significantly thanks to lower stiffness of this flexible conduit element, the resonances of which are damped and disappeared by this inventive structure in the operating frequency range, thus reducing noises audible for the passengers. Compared to the previously known designs, the tension limit of the flexible conduit element is also larger. Even though the outer flexible member is always in engagement with the bellows member due to the resilient member, the design still allows a comparatively large range for extension in an axial direction as in an unextended condition there is the gap between the bellows member and the outer flexible member 4. When extending the flexible conduit element, the gap will shrink or disappear and the outer flexible will more or less be completely in engagement with the bellows member 2 inducing friction between the bellows member and the outer flexible member, thereby dissipating vibrational energy. Still, the wire mesh structure of the outer flexible member is strong enough to protect the metal bellows. The larger traction limit is of significant importance as it allows to provide for more flexibility of the conduit element and also allows to use shorter flexible conduit elements which provide the same traction limit than previously known longer flexible conduit elements. In a given length of the flexible element, this larger traction limit provides better durability to the bellows member and the outer flexible member because those are free of the extreme stress occurring while the structure limit restricts large deflection of the flexible element body. Accordingly, weight saving is one of the advantages of the flexible conduit element according to the invention. The flexible conduit element as depicted in FIG. 1 is used mostly for diesel engines. In particular, the use of the inner tube using a braided wire mesh is advantageous when using diesel engines.

Now the second embodiment of the present invention will be discussed. In order to avoid a repetition, the second embodiment will only be described in comparison to the first embodiment and the same elements will be denoted with the same reference numerals.

As far as it concerns the design of the bellows member 2, the corrugations 3, the groove 7, the outer flexible member 4 and the resilient member 5, the design of the second embodiment is essentially identical to the first embodiment. The only difference is the number of corrugations of smaller radial extension which form the groove 7, in the second embodiment, there are four of such corrugations of which the most inner two corrugations have the same radial extension.

Figure 2:
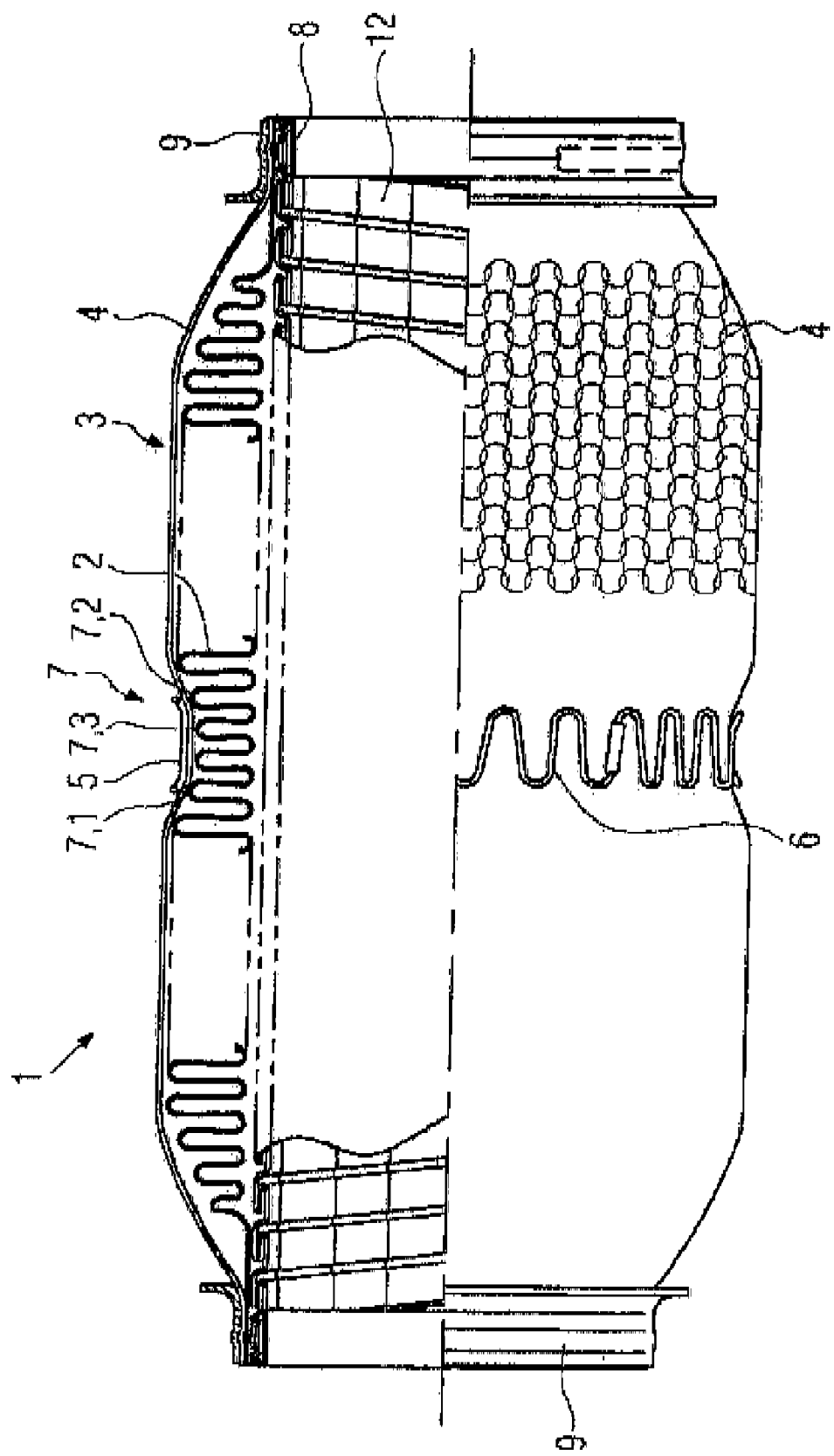
FIG. 2 shows a second embodiment of a flexible conduit element according to the invention in a partial cross-section.

Different to the first embodiment, the second embodiment uses an agrafe-type hose 12, of which in the upper half of FIG. 2 a cross-section is visible. The agrafe-type hose comprises spirally-shaped elements, which are connected in a known manner through a hook-like design. The agrafe-type hose 12, the bellows member 2 and the outer flexible member 4 are held together by an inner ring-shaped element 8 and an outer ring-shaped element 9. The design of the inner ring-shaped element 8 is slightly different compared to the design of the inner ring-shaped element 8 of the first embodiment due to the use of the agrafe-type hose 12. The embodiment for using the agrafe-type hose 12 is used for petrol engines. The use of the agrafe-type hose 12 allows less axial resistance when extending flexible conduit elements compared to the use of a braided wire mesh-type hose. Due to the design of the agrafe-type hose 12, there is however a very significant tension limit, when the agrafe-type hose is fully extended. Concerning the functioning of the outer flexible member 4, the second embodiment is identical to the first embodiment.

The invention claimed is:

1. A flexible conduit element for an exhaust system of a combustion engine vehicle, comprising:
   a helically or annularly corrugated preferably metal bellows member;
   an outer flexible member disposed around the bellows member; and
   a resilient member biasing at least a section of the flexible outer member towards the bellows member, wherein:
      the outer flexible member comprises a reticulated structure,
      the bellows member comprises a plurality of adjacent corrugations having a shorter extension than neighboring corrugations,
      the bellows member further comprises a groove defined by a first plurality of peaks from the neighboring corrugations and a second plurality of peaks from the adjacent corrugations having the shorter extension, the second plurality of peaks being disposed between the first plurality of peaks,
      the groove is located in a middle section of the bellows member,
      the resilient member is at least partially received within the groove, and
      the resilient member engages an outer surface of the flexible outer member.

2. A flexible conduit element according to claim 1, characterized in that the reticulated structure of the flexible outer member is a net structure.

3. A flexible conduit element according to claim 2, characterized in that the reticulated structure of the flexible outer member is a knitted structure.

4. A flexible conduit element according to claim 1, characterized in that the outer flexible member is essentially completely of a reticulated structure.

5. A flexible conduit element according to claim 1, characterized in that the flexible outer member comprises a metal wire material.

6. A flexible conduit element according to claim 1, characterized in that the flexible outer member comprises openings between the metal wire material and the openings cover at least 50% of the total surface of the flexible outer member.

7. A flexible conduit element according to claim 1, characterized in that the flexible outer member forms a hose disposed around the bellows member.

8. A flexible conduit element according to claim 1, characterized in that the flexible outer member is attached to both ends of the bellows member.

9. A flexible conduit element according to claim 1, characterized in that the flexible outer member is elastically deformable at least in its axial direction.

10. A flexible conduit element according to claim 1, characterized in that the bellows member comprises several grooves.

11. A flexible conduit element according to claim 1, characterized in that the outer flexible member is held between at least one of the corrugations forming the groove and the resilient member.

12. A flexible conduit element according to claim 1, characterized in that the conduit comprises, an inner tube within the bellows member.

13. A flexible conduit element according to claims 12, characterized in that the inner tube comprises an agrafe-type hose.

14. A flexible conduit element according to claim 12, characterized in that the inner tube comprises a braided hose.

15. A flexible conduit according to claim 1, wherein the resilient member comprises a spring.

16. A flexible conduit according to claim 15, wherein the spring comprises a plurality of undulations.

17. A flexible conduit according to claim 15, wherein the spring comprises a spirally-shaped spring element.

18. A flexible conduit according to claim 1, wherein the second plurality of peaks comprises three peaks.

19. A flexible conduit according to claim 1, wherein the second plurality of peaks comprises four peaks.

* * * * *